United States Patent [19]

Hommerin

[11] 3,775,613
[45] Nov. 27, 1973

[54] FILM CHANGER FOR X-RAY DIAGNOSTIC APPARATUS USING BARE FILM SHEETS

[75] Inventor: Michel Hommerin, Paris, France
[73] Assignee: Cie Generale De Radiologie, Paris, France
[22] Filed: Apr. 5, 1972
[21] Appl. No.: 241,164

[30] Foreign Application Priority Data
Apr. 30, 1971 France .............................. 7115609

[52] U.S. Cl. ........................................... 250/525
[51] Int. Cl. .......................................... G03b 41/16
[58] Field of Search ...................................... 250/66

[56] References Cited
UNITED STATES PATENTS
3,567,931   3/1971   Eilkema ............................... 250/66
3,488,496   1/1970   Schneeman .......................... 250/66

FOREIGN PATENTS OR APPLICATIONS
1,140,064   11/1962   Germany ............................ 250/66

Primary Examiner—Walter Stolwein
Assistant Examiner—C. E. Church
Attorney—John W. Malley et al.

[57] ABSTRACT

A film changer for X-ray diagnostic apparatus using bare film precut into sheets comprising three compartments, the middle one whereof making up the exposure and transfer section and the two lateral ones, containing two identical motor-driven electrically controlled magazines which are respectively and alternately used as a supply of unexposed film sheets and as a storage device for exposed undevelopped negatives.

2 Claims, 4 Drawing Figures

FILM CHANGER FOR X-RAY DIAGNOSTIC APPARATUS USING BARE FILM SHEETS

The present invention relates to film changers for X-ray diagnostic apparatus using bare film precut into sheets.

In known X-ray diagnostic apparatus of this type, as described for example in French Pat. No. 1,457,762 or in the published German Pat. application No. 1,931,919, the precut X-ray film, either bare or contained in a suitable packing which is opaque to visible light and transparent to X-rays, is respectively stacked, prior to and after exposure, in two separate stacks of parallel sheets having the same format. The transfer of each of the sheets from the magazine in which the unexposed film is stored, to the exposure location and from the latter to the magazine in which the exposed negatives are stored, is effected by a pair of motor-driven belts located in proximity of the respective edges of the film. The film or pack, and the belts, are respectively provided with openings and projections, or vice-versa, which engage with one another as the belts move and thus transfer the film.

When using a bare film, the magazines for the unexposed and exposed films are generally made up of lightproof boxes or cassettes and the operations of loading and unloading the film have to be carried out manually in a room illuminated by non-actinic light. The same applies to the extraction of the exposed negatives from the aforementioned packs, prior to their insertion one by one into a suitable developer system. In addition, the film or the pack containing it, has to be equipped with elements which will engage with the corresponding belt elements, rendering the negative more expensive.

The device in accordance with the invention enables these drawbacks to be overcome. In the latter it is possible to load the magazine, which has its own motor, with precut unexposed film coming, for example, from a device for cutting spool-wound film into sheets, and to unload it, when it is filled with exposed negatives, into a matching developer system without employing any manual handling. An X-ray diagnostic apparatus can be equipped with two identical and interchangeable feeder and receiver magazines according to the invention, that is to say that a feeder magazine feeding out unexposed film and which has just become empty can be used to replace a receiver magazine for exposed film, which has just become filled.

A type of magazine which can be utilised in the film-changer in accordance with the invention, has been described and illustrated in the applicant's copending U.S. Pat. application Ser. No. 162,568 filed on July 29, 1971.

In such magazines the exposed and/or unexposed film-sheets are stored on a roller or spool between two sheets of flexible material which are thus protected.

It comprises in particular a light-tight box with a slot for the introduction or ejection of the sheets of film, a central motor-driven film storage spool, a reserve spool equipped with a flexible band of plastic material which, when wrapped around the central spool, passes between two entry rollers opposite the slot, and drives the sheets of film so that the latter are successively stored between two faces of the band on the central spool. For the successive ejection of these film sheets, it is merely necessary to wind the band onto the reserve spool which is motor driven for the purpose.

Another advantage of such a magazine in accordance with the invention consists in the fact that it enables the thus stored negatives to be transferred one by one to an automatic film-processing unit, this transfer function being effected very readily by presenting the slot of the magazine opposite the input slot of said unit, and by operating an electric motor contained in the magazine. It is also possible to adapt the walls of these devices in order to make it possible to unload the magazine in accordance with the invention in daylight.

According to the invention, there is provided a film changer for X-ray diagnostic apparatus using bare film precut into sheets and comprising a housing including three compartments forming respectively : a film supply section for containing a supply of unexposed film sheets ; an exposure section for locating said film sheets in position for exposure ; and a storage section for exposed film sheets ; said supply and storage sections respectively containing two identical electrically controlled motor-driven magazines ; each of said magazines comprising a lightproof housing provided with a slot and including therein a supple hand of plastic material of prdetermined length wound around two motor-driven spools respectively carrying the opposite extremities of said band, one of said spools storing said exposed or unexposed film sheets wound thereon between two faces of said band ; said exposure section including electrical motor-driven means for transporting said flim sheets from said supply section into said exposure position and from said latter into said storage section ; said film changer further comprising means for simultaneously electrically controlling said two motor-driven magazines and said transporting means.

In order that the invention may more readily be understood and other features and advantages thereof become apparent some embodiments of same will now be described, by way of example, with reference to the accompanying drawings, wherein.

Figure 1:
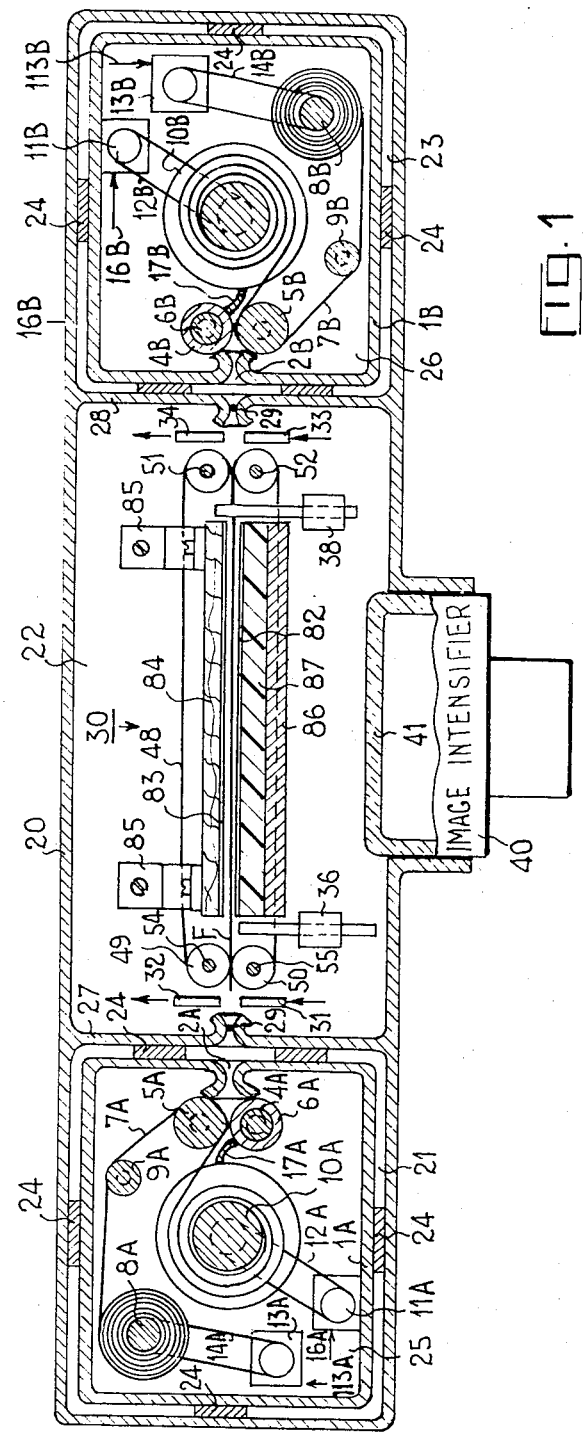
FIG. 1 is a schematic cross-sectional view of an embodiment of the film changer in accordance with the invention.
Figure 3:
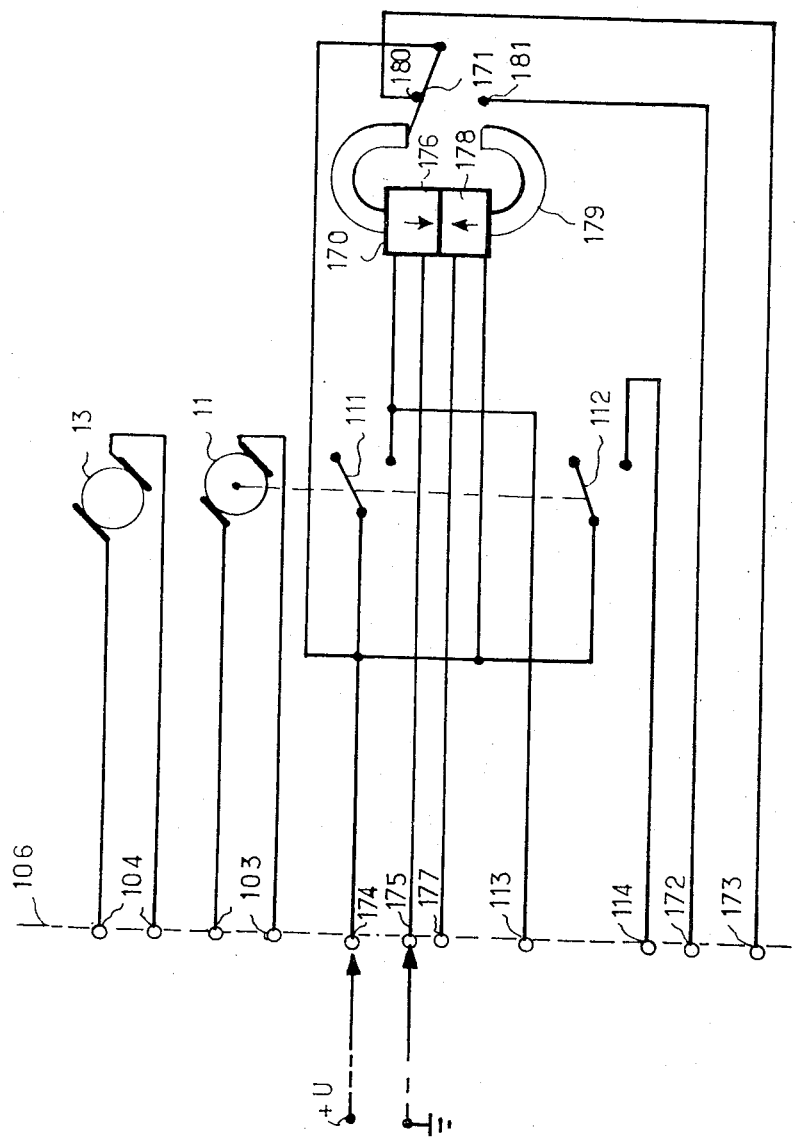
Figure 4:
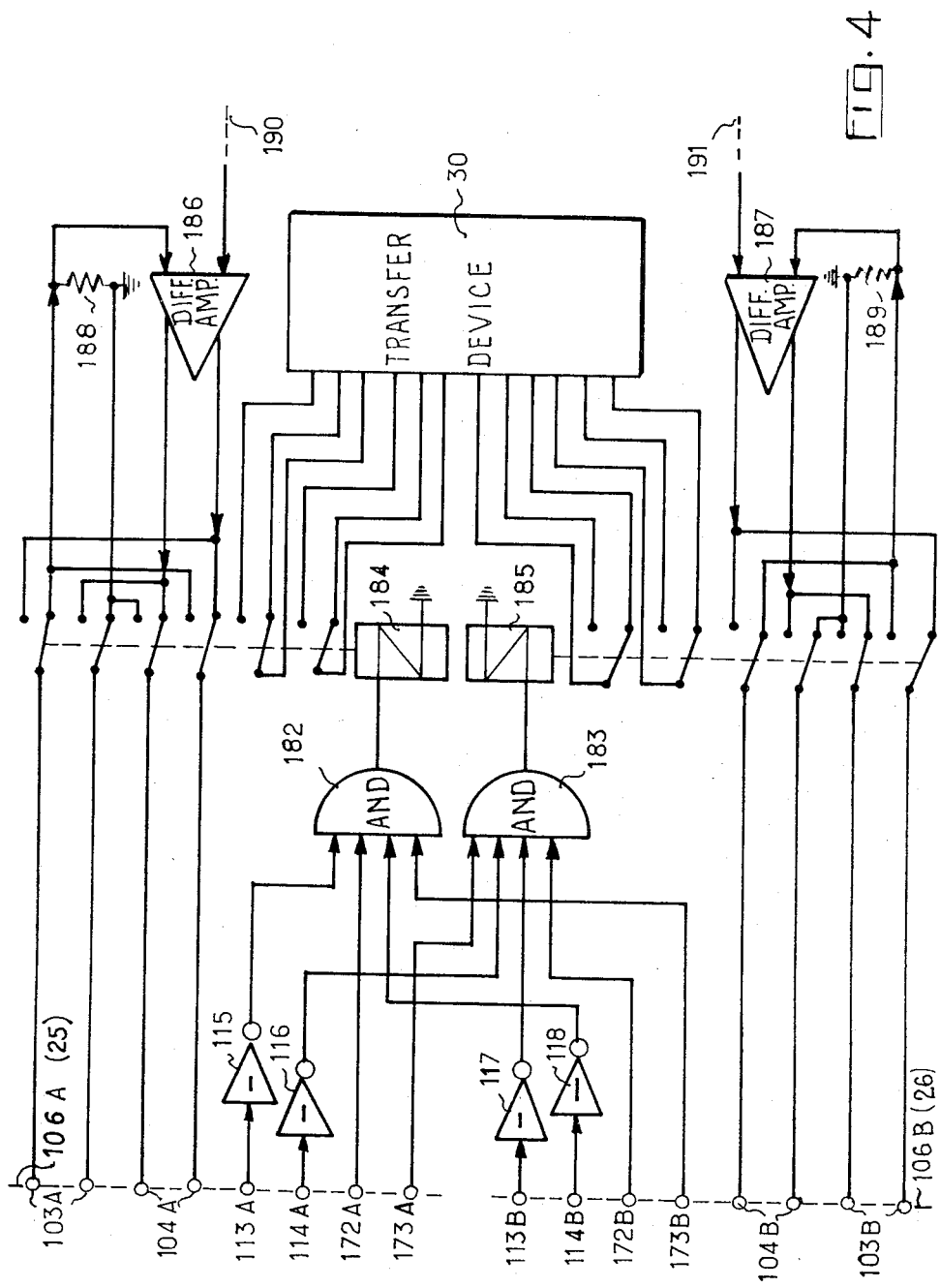

FIG. 3 schematically illustrates the electrical circuit located inside the magazine 25 and 26 illustrated in FIG. 1;

FIG. 4 illustrates a partial control circuit diagram of the film-changer, which is designed to cooperate with magazines having a circuit of the kind shown in FIG. 3.

In FIG. 1, the film-changer comprises a frame 20 divided into three compartments 21, 22 and 23, one of which makes up the loading section, the middle one the film transfer section and a further one the section in which the exposed negatives are stored.

The compartments 21 and 23 respectively contain two magazines 25 and 26, identical with one another, based upon a principle similar to that described in the applicant's aforesaid copending Patent Application. They respectively comprise parallelepiped lightproof box-shaped housings 1A and 1B with slots 2A and 2B for the passage of the film F. In each of the magazines, this slot 2A (or 2B) is obturated by two cylindrical rollers 4A and 5A (or 4B and 5B) the first of which has a flexible surface (6A or 6B). The second roller 5A (or 5B) likewise does duty as a return roller for a flexible band 7 A (or 7B) of plastic material, for example polyethylene terephtalate, which is preferably metallised and has a width slightly larger than that of the film F. The band reserve 7 A (or 7 B) is rotated on a cylindrical spool 8A (or 8B) and is passed around a return roller 9A (or 9B) and the roller 5A (or 5B) to a cylindrical central spool 10A (or 10B). The central spool 10A (or 10B) is driven by a first reversable motor or motor and reduction gear set 11A (or 11B), through a belt 12A (or 12B) for example. The cylindrical spool 8A (or 8B) carrying the band reserve 7A (or 7B) is likewise driven by a second reversable motor or motor and reduction gear set 13A (or 13B) and a second belt 14A (or 14B) for example. A deflector 17A (or 17B) is arranged between the rollers 4A and 5A (or 4B and 5B) and the central spool 10A (or 10B) in order to guide the film F.

It should be pointed out here that since the film is wound on the spool 10 between two faces of the band 7, in a manner to be described hereinafter, if said band is opaque or if the film is insensitive to daylight, it is not necessary for the rollers 4 and 5 to be contiguous nor for them to close off the slot 2.

In the embodiment illustrated in FIG. 1, the magazines 25 and 26 are respectively installed in the compartments 21 and 22 through lateral openings in the frame 20 and are positioned for example by means of guides 24 fixed to the walls of the frame. The wall opposite the aforementioned lateral opening is fitted with a bank of connectors designed to receive the corresponding connectors attached to the wall of the magazine (not shown in FIG. 1), these two connectors linking the electrical drive and signalling devices which the magazine contains, with the electrical control, supply, safety and signalling devices which form part of the control panel and/or of other compartments of the film-changer and/or the X-ray table in which the latter is installed.

The transfer compartment 22 is separated from the two other compartments 21 and 23 by respective walls 27 and 28 containing slots 29 located opposite the slots 2A and 2B in the magazines 25 and 26. These slots 29 are fitted with lips at either side, these lips guiding the sheets of film.

The transfer section is provided at the entry and exit of the transfer device 30, with devices for signalling the presence of the film at these points, thus indicating that the film is in the course of transfer between two sections. Said devices respectively comprise infra-red radiation sources 31 and 33 and radiation detectors 32 and 34, disposed at either side of the plane of the film so that the radiation, passing substantially perpendicularly to said plane, is cut off when a sheet of film passes between the source and the detector.

Figure 2:
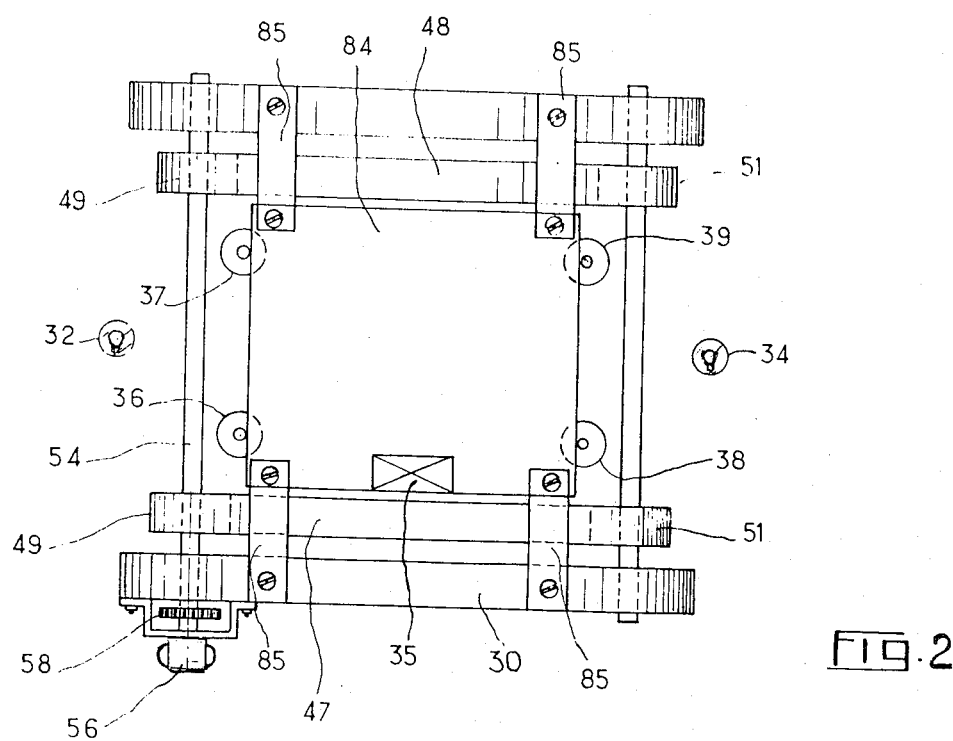
FIG. 2 is a simplified plan view of the embodiment of the transfer device 30 shown in FIG. 1.

The transfer device proper, FIG. 2 showing a plan view thereof, includes two pairs of flat belts 47 (see FIG. 2) and 48, located at either side of said device in the direction of translation and entrapping the film at each of its two edges. These four belts are tensioned around four pairs of rollers 49 to 52. The first two pairs of rollers 49 and 50 are respectively fixed to two shafts 54 and 55, these shafts being driven in opposite directions to one another, by a motor 56 and a pair of gears 58.

When the X-ray film being used is not covered by an X-ray sensitive emulsion, it is essential when exposing it to utilise image-intensifying screens which are contiguous with the two faces of the film.

To this end, the transfer device 30 comprises a top image-intensifying screen 83 attached to the bottom face of a first rectangular plate 84 of a uniform X-ray transparent material. Said plate 84 is fixed in relation to the frame 20 and assembled upon the chassis of the device 30 for example by means of fixing lugs 85. A bottom image-intensifier screen 82 has to be placed in contact with the film when the latter is in the exposure position, i.e., is fully within the field of the X-rays. The bottom screen 82 is stuck to the top surface of a flexible lining 87 which ensures uniform pressure over the film area, (the lining being made of synthetic foamed material for example), which lining is fixed to a bottom rectangular plate 86 of cylindrically bowed form, moveable perpendicularly to the plane of the film by means of a mechanism comprising at least one or more electrically controlled drive elements (not shown in the Figure). Said mechanism can either be designed in the manner set out in U.S. Pat. No. 3,710,106 filed on July 14, 1971, or in the shape of two or more electromagnets for example. The bottom plate 86 is lowered by means of return springs for example (not shown).

The top plate 84, in one of the variant embodiments of the film-changer in accordance with the invention, comprises a conventional film marking device 15.

If the film utilised in the film-changer in accordance with the invention is X-ray sensitive, i.e., requires no image-intensifier screens, then the transfer device will instead be fitted with two fixed parallel deflector plates which guide the displacement of the film, at least the top one of these deflectors having to be uniform and X-ray transparent.

It will be remarked here that if it is desired to combine the film-changer in accordance with the invention with an electronic (optical) image intensifier 40, the pressure plate 86 or bottom deflector will have to be made of a relatively X-ray transparent a material (for example a light metal such as aluminium or beryllium) and its bottom face, over the area facing the input screen 41 of the intensifier 40 will have to be flat and uniform ; the space between this plate and the screen 41 will, furthermore, have to be free of any X-ray opaque object.

The device 30 is, furthermore, equipped with a set of retractable stops which halt the film in a position in which it is centered, in accordance with the direction of the transfer, within the X-ray (exposure) field, the latter being defined in one case by the image-intensifier screens. If the film-changer is operated in reversible fashion, that is to say if the compartments 21 and 23 and the magazines 25 and 26 which they contain, alternately play the part of loading and storage sections and vice-versa, the transfer device must be fitted with two sets of stops located at either side of the pressure plates or deflectors, in the direction of transfer of the film. These retractable stops are formed in this case by two pairs of vertically oriented foster electromagnets 36, 37 at one side and 38, 39 at the other side of the plates.

FIG. 3 illustrates highly schematically part of the circuit contained inside a magazine 25 or 26 of FIG. 1. In FIG. 3, the first 11 and second 13 motors are respectively connected to the pairs of pins 103 and 104 of connector 106. The magazine further comprises a coder device 110 (not shown in FIG. 1) including a shaft coupled to that of one of the spools and two contact breakers 111 and 112 respectively signalling the terminal positions of the central spool, that is to say the make contact of the first one 111 signals that the magazine is empty and that of the second one 112 signals that the magazine is full. In addition, the coder 110 signals the angular position of its shaft, which is driven by that of the central spool 10, for example, in order to indicate the number of film sheets which have been fed out or stored. This angular position can be signalled either by an analogue voltage (spiral-wound potentiometer) or by a digital number (digital angle coder), for example, which is processed in a known computer device eventually part of the control panel of the X-ray diagnostic apparatus having a film changer in accordance with the invention.

The signalling by the contact brakers 111 and 112 takes the form of voltages appearing respectively on the pins 113 and 114 of the connector 106 of the magazine, when the contacts are closed. To this end, a voltage U is permanently applied to the pin 174.

The magazine furthermore comprises a differential polarised relay 170, that is to say a relay which has a magnetic latching facility in the form of a permanent magnet 179, acting as a bistable element with two stable positions. The relay 170 comprises, for example, two windings supplied in opposite directions, the first 176 of which establishes a connection between the moving contact 171 and the first contact 180, and the second 178 a connection between the moving contact 171 and the second fixed contact 181, the moving contact 171 being supplied with the voltage U from the pin 174 of the connector. The relay 170, which must remain in the position which it occupies when neither of its windings 176 and 178 is supplied, signals the quality of film contained in the magazine in order to determine the direction of movement of the band and, consequently, to determine which of the motors 11 or 13 is to be supplied. This signalling takes the form of the voltage U on one of the pins 172 and 173 of the connector 106, which are connected respectively to the second and to the first fixed contacts, the voltage U of the first pin 172 indicating that the film contained in the magazine is unexposed and its appearance on the second 173 signalling that the magazine is empty or that it contains exposed film.

The pulling up of the relay 170, to signal unexposed film, is controlled by the unexposed film loading device (not shown), the pin 177 of the connector being connected to the negative terminal of a supply source producing a voltage U, its positive terminal being connected to the pin 174 and the pin 175 being left unconnected. Pulling up of the said relay in the opposite direction (empty or exposed) is controlled by the contact breaker 111 of the coder 110 since in each of the compartments 21 and 23 the pins 174 and 175 are respectively connected to the terminals of a supply source producing a voltage U.

It is to be noted here, that it is equally possible to control the relay 170 through a single winding, by using voltages of opposite polarity or by using a polarised relay with a single winding.

In FIG. 4, a partial illustration of an embodiment of the control circuit, in particular the part controlling the direction of transportation of the film, has been shown.

The circuit of FIG. 4 utilises data produced by the coders 110 and the polarised bistable relays 170 (see FIG. 3), of the two magazines 25 and 26 (see FIG. 1), in order, on the one hand, to determine the direction of rotation of the motors of the film-changer, that is to say those of the magazines and of the motor 56 of the film transfer device 30 (see FIG. 2), and, on the other hand, to determine the mode of operation of the detectors and the radiation sources 31 to 34 (which will be explained hereinafter) and the choice of the retractable stops 36 to 39 used to halt the film in the exposure position.

It comprises a logic circuit made up of two AND-gates 182 and 183, having four inputs each, the first of which gates 182 is supplied by the pins 113A and 172A of the first magazIne 25 located in the compartment 21, and by the pins 114B and 173B of the second magazine 26 located in the compartment 23. Pins 113A and 114B respectively indicating that the first magazine is empty and the second full, are connected to the inputs of the first AND-gate 182 through NOT-gates 115 and 118. Similarly, the second AND-gate 183 is supplied by the pins 173A and 172B directly and by the pins 114A and 113B respectively through NOT-gates 116 and 117. The two AND-gates 182 and 183 respectively control two inverter relays 184 and 185 as a function of the data appearing respectively at the outputs of the two magazines 25 and 26.

For example, when the magazine 25 located in the compartment 21 contains unexposed film (U on pin 172A) and is not empty (zero on pin 113A, that is to say U at the output of 115), and when the magazine 26 of compartment 23 is not full (zero on pin 114B, that is to say U at output 118), and is either empty or contains exposed film (U on 173 B), the first AND-gate 182 produces a direct voltage which it supplies to the coil of the relay 184, causing the latter to pull up and place its contacts in the make position. At the same time, the second AND-gate 183 receives data indicating that the magazine 25 contains no exposed film (zero on 173 A) and that the magazine 26 contains no unexposed film (zero on 172B), and, since the coil of the relay 185 is not supplied, its contacts remain in the break position.

The contacts of the relays 184 and 185, as will be explained hereinafter, are responsible, on the one hand, for switching the supply to the motors of the magazines, and, on the other hand, for switching the circuit of the transfer device 30 located in the compartment 22, in order that transfer is effected from the magazine 25 containing the unexposed film to the transfer device 30 and from the latter to the magazine 26 which may be empty or may contain exposed film. If the roles of the magazines were exchanged, so that the one containing the unexposed film was located in the compartment 23, then the circuit of FIG. 7 could automatically carry out switching to transport the film in the reverse direction.

In the embodiment corresponding to FIGS. 1 and 3, one of the motors of each magazine is supplied with the help of a differential amplifier 186 or 187 responsible for speed control, which is supplied on the one hand with a voltage coming from the field winding of the other motor of the same magazine, a load in the form of a resistor 188 or 189 being used to make this motor simultaneously play the parts of brake and tachogenerator, and on the other hand, with a voltage corresponding to the set point speed, which is produced by a source marked 190 or 191.

The operation of the film-changer as illustrated by FIGS. 1, 2, 3 and 4 is as follows:

With the two magazines 25 and 26 empty of film, one of them (26) is assembled in one (23) of the two compartments 21 and 23 provided for this purpose. The connector 106B of the magazine 26 will therefore be connected to the film-changer circuit which, on its pin 174B, supplies said connector with a positive voltage U, the pin 175B being earthed. The contact 11B of the coder 110B of the magazine 26 being closed, since said magazine is empty, the voltage U applied to the winding 176B of the relay 170B causes the latter to pull up so that the voltage U appears on the pin 173B of the connector 106B.

The other magazine 25 is taken for example to a darkroom where it is loaded with unexposed film either manually by introducing precut films one by one through the slot 2A or automatically using an associated spool film feed and cutting (guillotining) system, this system, for example, being similar to the loading section of the X-ray apparatus described in the aforementioned U.S. Pat. No. 3,710,106. It will be observed here that in this latter case it is possible, by adaptation of the walls of the magazine and the associated system, to make the arrangement lightproof so that loading can be carried out in daylight. It is also a simple matter to produce a common control circuit for the associated system and the magazine, so that the loading can be carried out automatically by synchronising the various controls of the motors used, and so that the system halts automatically when the magazine is full (the voltage U appearing on the pin 114 of the connector 106).

Loading is carried out in the following manner : When an unexposed film sheet is fed to the slot 2 of the box-shaped housing 1, and when it comes into contact with the rollers 4 and 5, the first motor 11 is started by a voltage applied to its input 16, driving the central spool 10 in the clockwise direction. The band 7 is wound around the spool 10 and the film F, picked up between said band 7 and the flexible surface 6 of the roller 4, is likewise driven towards the spool 10, guided by the deflector 17 as it goes. When the film sheet F reaches the spool 10, it is taken between two faces of the band 7 and subsequently wound up therewith. When this film sheet is fully wound into the spool 10, the first motor 11 is halted until another film sheet arrives for storage. The starting and stopping of the motor 11 can be controlled a photoelectric cell responsive to non-actinic radiation (not shown) located for example at the magazine input (between slot 2 and input rollers 4 and 5) and connected likewise to the associated system ; the starting of the motor 11 is controlled by the cutting of the beam between the radiation emitter and the detector cell, and the motor is stopped by the re-establishment of this beam, the timing being such that the film has had an opportunity to penetrate sufficiently far into the interior of the magazine.

During the winding of the film F and the band 7 onto the spool 10, the spool 8 pays off the band 7. If the reduction gear of the motor 13 is reversible, the motor 13 can be preferably utilised here both as a tachogenerator and as a brake, that is to say that the winding of its rotor is connected to an external circuit (outside the magazine) containing a resistor through which the current generated by its rotation flows. Across the terminals of this resistor a voltage is picked up which is proportional to the speed of rotation of the motor. This voltage is used to control the speed of the motor 11. If the braking thus obtained to maintain the band 7 under tension is insufficient, the motor 13 can be used purely as a brake by supplying its rotor with a low voltage whose polarity is such that the motor 13 opposes the unwinding of the band 7 from spool 8.

The controlling of a constant speed in the motor 11 during the storage of the film, will be effected for example by means of the back-e.m.f. of the motor 13 itself or again with the help of a supplementary tachogenerator coupled to either of the motors 11 or 13.

During the filling of the magazine 25 with unexposed film, the terminal 174A of the connector 106A receives a positive voltage U, whilst the terminal 177A is earthed (FIG. 3). Said voltage U supplies the winding 178A of the relay 170A and causes it to pull up, connecting the moving contact 171A with the fixed contact 180A in order to produce on pin 172 A a signal meaning that the magazine contains unexposed film.

When the magazine 25 is loaded, it is inserted into the empty compartment 21 and its internal circuit, shown in FIG. 3, is connected to the control circuit of FIG. 4.

The magazine 26 being empty, the data produced in the form of voltages by the two magazines unblock the first AND-gate 182 whilst the second AND-gate 183 remains blocked. The first gate 182 now being unblocked, the relay 184 pulls up to connect the second motor 13A to the output of the amplifier 186 and the first motor 11A to the resistor 188, whilst the relay 185 reimains in the dropped condition, connecting the first motor 11B to the output of the amplifier 187 and the second 13B to the resistor 189. As far as the transfer device 30 is concerned, the relay 184 possesses contacts which control the polarity of the voltage applied to the motor 56 driving the belts and which select the retractable solenoid stops 38 and 39 used (disconnecting the others 36 and 37), as well as the mode of operation of the two non-actinic barriers in the control circuit of the motor 56 and those (not shown) of the magazines 25 and 26.

When an exposure has been made, the previously selected electromagnets 38 and 39 are energised, the motor 13A of the magazine 25 is started and drives the spool 8A upon which the band 7A is wound up, being at the same the unwound from the central storage spool 10A. The unwinding of the band from the central spool 10A drives a first sheet of unexposed flim stored there and this sheet, guided between the band 7A and the deflector 17A across the space between the rollers 5A and 4A, is ejected towards the slot 2A of the magazine and that 29 of the wall 27 of the central compartment 22. The first sheet of film passes through the first barrier 31–32 controlling the starting of the motor 56 when the beam is cut by the film. The film is then picked up between the belts 47 and 48 and transferred by these towards the retractable stops 38 and 39. During this ejecting phase, the motor and reduction gear set 11A coupled to the spool 10 A acts as a tachogenerator and as a brake in the same manner and subject to the same restrictions, as the motor 13A does during the storage of the unexposed films.

The film having passed through the first barrier, a light contact is re-established, disconnecting the motor 56 on the one hand and stopping the motor 13A on the other, after a certain delay the movement of the pressure plate 87 also being initiated. After the motor 56 has been disconnected, the film carries on under its own inertia until it hits the stops 38 and 39 which halt it. When the pressure has been applied, a device controlling the overall equipment (not shown) starts the X-ray generator which supplies the X-ray tube.

The film having been exposed and marked, the plate 86 descends again and the electromagnets 38 and 39 are deactivated. The belts driven by the motor 56 then eject the exposed film towards the magazine 26 which operates in precisely the same way as does the magazine 25 during the latter's filling with unexposed films, that is to say that the motor 11B is started as soon as the film detection barrier 33–34 is cut by the exposed film sheet, and stops after a timed period, when the barrier ceases to register the presence of the film sheet therebetween. The negative is then taken between two faces of the band 7B and wound onto the spool 10B.

If the magazines have been interchanged, the direction of displacement of the film will have been the opposite. In other words, the magazines "remember" the data concerning the quantity and quality of the film which they contain, through the agency of the coder 110 and the bistable relay 170, so that any exchange would have blocked the gate 182 and unblocked the gate 183, reversing the positions of the relays 184 and 185 : the operative electromagnets would then be the electromagnets 36 and 37, the motor 56 would rotate in the opposite direction to that aforedescribed, and the data from the barriers 31–32 on the one hand and 32–34 on the other, would have been interchanged.

The exposing of films continues until the magazine containing the unexposed films is empty or until the magazine containing the exposed ones is full, in which case neither of the gates 182 and 183 is unblocked and the system comes to a halt. A visual display of the state of the magazines is provided either on the changer or on the control panel. It should be remembered of course that as soon as the magazine which orignially contained the unexposed films, is empty, the electromagnet switches the relay 170 from contact 181 to contact 180 so that this magazine, remaining where it is, is ready to receive exposed films.

The unloading of the magazine containing the exposed films either in a darkroom or directly into an automatic developing machine, is carried out with the help of an auxiliary supply which energizes the motor 13 until the information "empty" produced by the contact 111 of the coder 110, automatically stops this motor.

After the unloading, the empty magazine can be loaded with unexposed films by means of the associated system described hereinbefore, the empty magazine which previously contained the unexposed film being then used to receive the exposed film and remaining where it is.

It will be observed that the film-changer in accordance with the invention as described hereinbefore, can comprise a control device enabling it, on the one hand, to take X-ray films one by one and to interpose fluoroscopic examinations carried out with the help of the image intensifier 40 of FIG. 1, between each film exposure, this without unnecessarily irradiating the film, and, on the other hand, to take a predetermined number of successive films in rapid sequences known as bursts, fluoroscopic examinations being possible at the start and at the end of each series.

Of course, the invention is not limited to the embodiment described and shown which was given solely by way of example.

I claim:

1. Film changer for X-ray diagnostic apparatus, using bare film precut into sheets and comprising a first housing subdivided into three compartments by means of two symmetrically spaced walls, each having a narrow first slot for allowing the transfer of film sheets between said compartments ; the lateral ones of said compartments alternately and respectively forming :

a film supply section for containing a supply of unexposed film sheets and a storage section for storing exposed ones and the middle one of said compartments forming an exposure and transfer section for succcessively transferring said unexposed film from said supply section and locating them in position for exposure and for transfering said exposed film sheets to said storage section ;

said lateral compartments respectively containing two identical electrically controlled removable magazines and respectively comprising two first electrical connector means for delivering supply voltages to and signals from said magazines, having a plurality of contacts ;

each of said magazines comprising a light-tight second housing provided with an elongated narrow second slot for the introduction of said film sheets therein and their ejection therefrom, one by one, and including within said second housing :

flexible means made up from a band of plastic material ; a motor-driven supply spool for containing a supply of said flexible means, whose one extremity is fixed thereto ;

a motor-driven storage spool for storing said film sheets thereupon between two faces of said flexible means, whose other extremity is fixed to said storage spool substantially located at the center of said housing, said supply and storage spools having respective shafts parallel to said slot ;

a pair of contiguous cylindrical rollers parallel to and located close to said slot for light-tightly shielding said magazine, said flexible means, between said supply and said storage spool, passing around one roller of said pair and between both of then, whereby to guide said film sheets to be stored, from said slot towards said storage spool and/or those to be ejected from said storage spool towards said slot;

first electrical motor means for respectively driving said supply and storage spools ;

second electrical connector means having a plurality of contacts mounted on said housing for interconnection with said first connector means ;

rotary signalling means having a shaft coupled to that of one of said spools and fed by one of said supply voltages for delivering a first signal to a first one of said contacts when said storage spool is empty and a second signal to a second one of said contacts when said storage spool is full ;

electrically operated bistable switching means for indicating whether the film contained therein is exposed or unexposed, said switching means being made up by a polarized relay with magnetic latching so as to remain in any one of its stable states without being fed by a control voltage ;

said relay being set into its first state by means of a control voltage applied to a third contact of said connecting means while being charged with unexposed film for delivering a third signal indicating the presence thereof to a fourth contact and reset into its second state by means of said first signal when it becomes empty for delivering a fourth signal indicating the emptyness or the presence exposed film sheets to a fith contact ;

said exposure and transfer section including motor-driven means for transporting said film sheets and second electrical motor means for driving said transporting means ;

said film changer further comprising means for simultaneously electrically controlling the operation of said first and second electrical motor means, electrically connected to said two first connector means and said second motor means for receiving said first second, third and fourth signals from both of said magazines and for delivering supply voltages to said first and second motor means, said rotary signalling means and said bistable switching means and including :

logic circuit means fed by said signals for discriminating between the magazines which contain exposed or unexposed film and which are full or empty ;

switching means controlled by said logic circuit means for inverting the direction rotation of said first and second motor means in accordance with the content of said magazines, whereby said film changer is rendered reversible.

2. Film changer as claimed in claim 1, wherein said transporting means further comprise two pairs of contiguous belts driven by said second motor means for respectively pinching said film sheet between them by its lateral edges ;

two retractable electromagnetic stop means for stopping said film sheet in said exposure position selected and controlled by said controlling means ;

a first and a second light barrier respectively located in the vicinity of said second slots, each of said barriers including a source and a detector of non-actinic radiation located at either side of the film sheet trajectory for signalling the presence of said film sheets at the respective barriers by means of electrical signals delivered by said detectors to said controlling means for enabling them to control the operation of said second motor means driving said belts.

* * * * *